United States Patent
Furuya et al.

(10) Patent No.: US 8,406,394 B2
(45) Date of Patent: Mar. 26, 2013

(54) ADVERTISEMENT DELIVERY SYSTEM, CALL CONTROL APPARATUS, AND ADVERTISEMENT DELIVERY METHOD

(75) Inventors: Joji Furuya, Kawasaki (JP); Kazuyoshi Kondo, Kawasaki (JP); Tomohiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/691,945

(22) Filed: Jan. 22, 2010

(65) Prior Publication Data
US 2010/0131974 A1 May 27, 2010

Related U.S. Application Data

(63) Continuation of application No. PCT/JP2007/066946, filed on Aug. 30, 2007.

(51) Int. Cl.
*H04M 11/00* (2006.01)
(52) U.S. Cl. ............. 379/93.17; 379/114.13; 348/14.01
(58) Field of Classification Search ............. 379/114.13, 379/93.17, 93.12; 348/14.01
See application file for complete search history.

(56) References Cited

U.S. PATENT DOCUMENTS

| | | | |
|---|---|---|---|
| 6,084,628 A * | 7/2000 | Sawyer | 725/34 |
| 2007/0116227 A1* | 5/2007 | Vitenson et al. | 379/207.02 |

FOREIGN PATENT DOCUMENTS

| | | |
|---|---|---|
| JP | 10-322459 | 12/1998 |
| JP | 2000-201229 | 7/2000 |
| JP | 2001-186575 | 7/2001 |
| JP | 2002-218061 | 8/2002 |
| JP | 2002-534004 | 10/2002 |
| JP | 2004-236255 | 8/2004 |

OTHER PUBLICATIONS

International Search Report for PCT/JP2007/066946, mailed Oct. 2, 2007.

* cited by examiner

*Primary Examiner* — Olisa Anwah
(74) *Attorney, Agent, or Firm* — Staas & Halsey LLP

(57) ABSTRACT

An advertisement delivery system by a telephone service utilizing IP telephone communication technology. The system comprises at least a call control apparatus controlling calling between a sending side terminal provided with a reproduction device and a receiving side terminal, and an advertisement delivery apparatus delivering advertisement video information to the terminal. The call control apparatus comprises a monitoring function unit monitoring the "voice media state" and "video media state" of the terminal and a delivery connection function unit delivering the advertisement video information based on the results of monitoring.

17 Claims, 18 Drawing Sheets

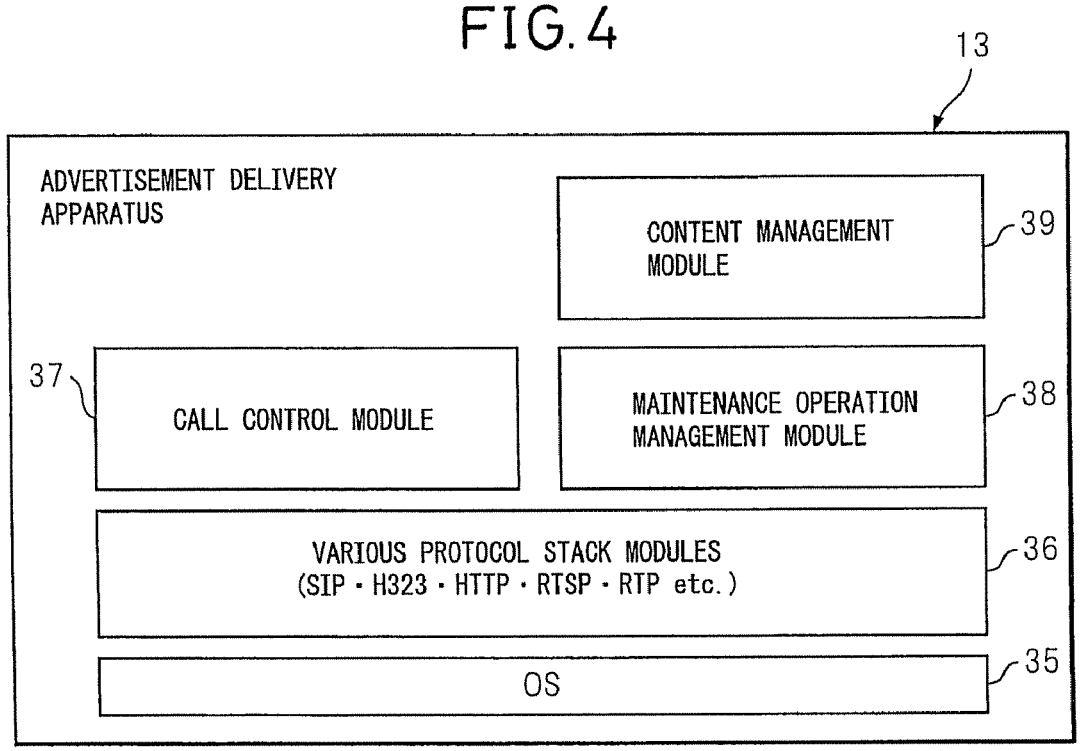
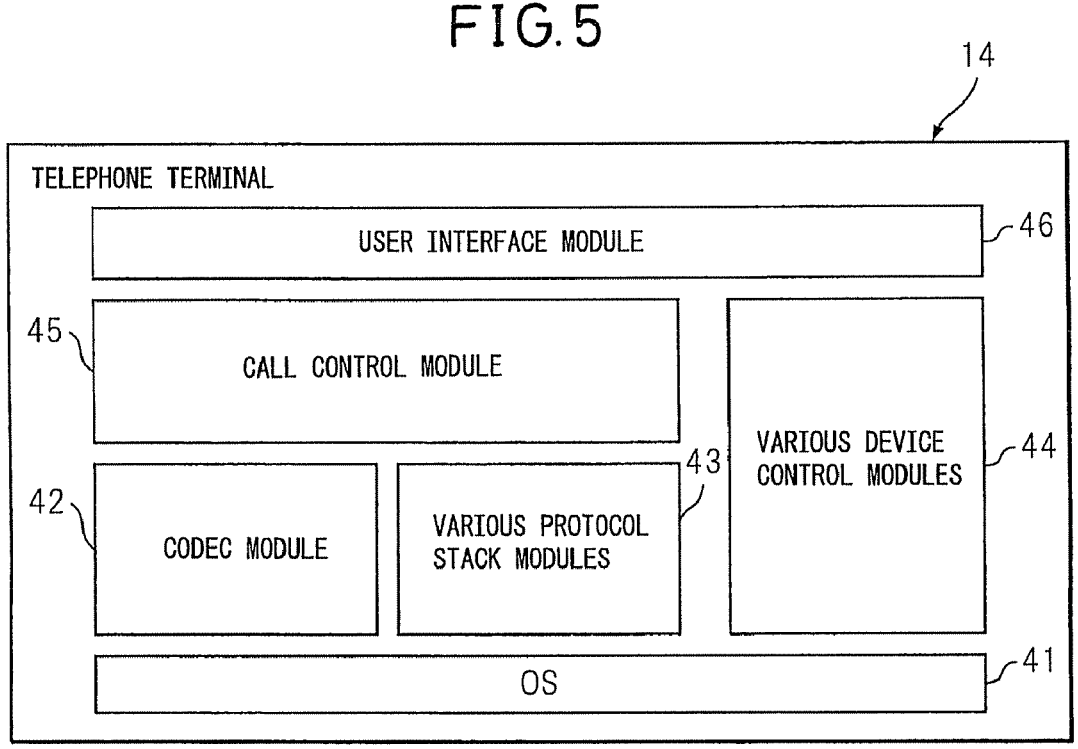

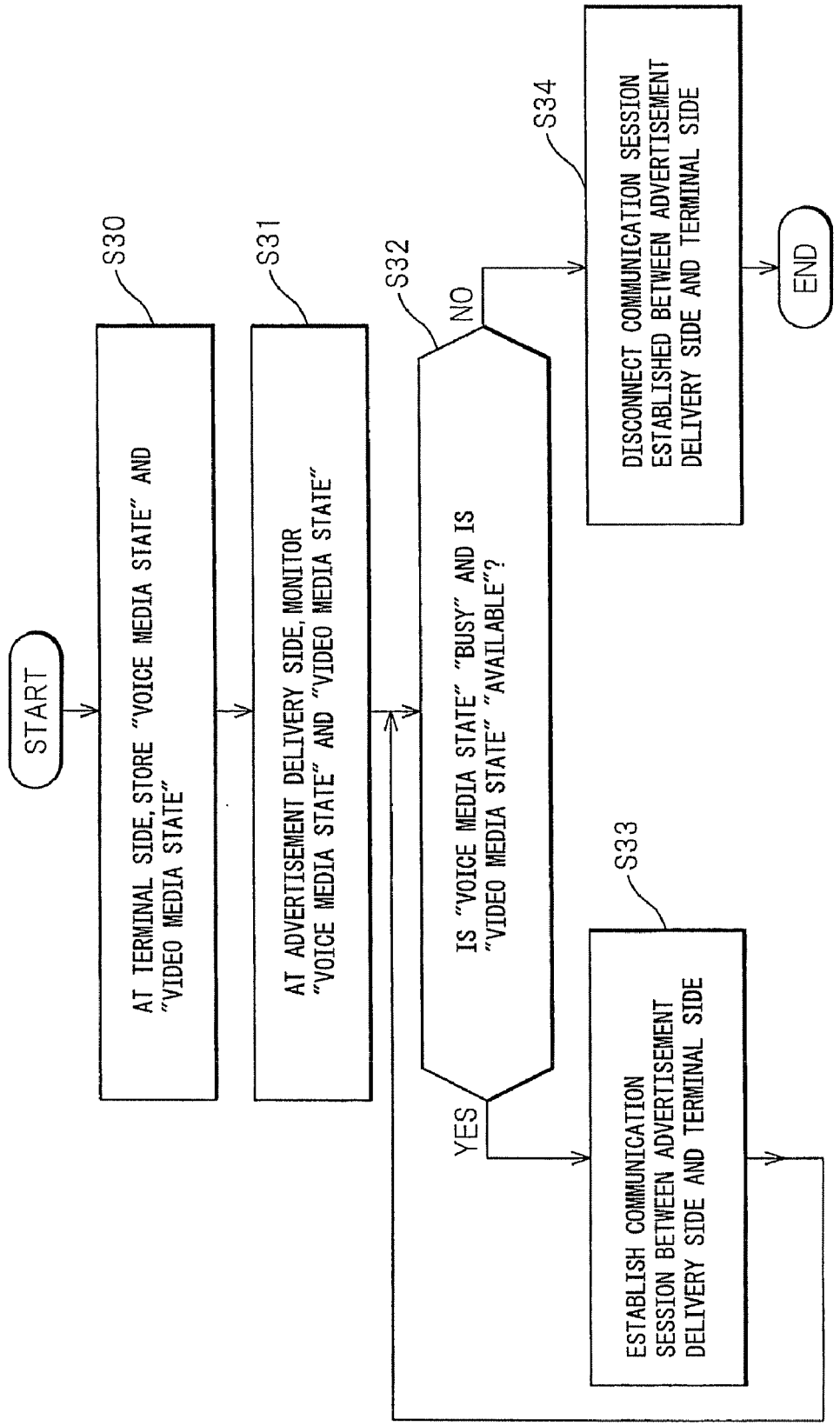

ADVERTISEMENT DELIVERY SYSTEM, CALL CONTROL APPARATUS, AND ADVERTISEMENT DELIVERY METHOD

CROSS-REFERENCE TO RELATED APPLICATION

This application is a continuation application based on International Application No. PCT/JP2007/066946, filed on Aug. 30, 2007, the contents being incorporated herein by reference.

FIELD

The embodiments discussed herein relate to an advertisement delivery system, preferably relate to an advertisement delivery system comprising at least a call control apparatus in a network, more preferably relate to a call control apparatus for the same and an advertisement delivery method.

BACKGROUND

Until now, ordinary telephones and mobile phones have mainly been targeted for delivery of advertisements by telephone services.

However, in recent years, IP (Internet Protocol) telephones have been rapidly spreading. In the future, advertisement delivery systems by telephone services utilizing communication technology unique to these IP telephones are expected to be realized. The embodiments hereinafter attempt to realize such an advertisement delivery system by IP telephone services.

As methods for delivering advertisements by telephone services, the three advertisement delivery methods (1), (2), and (3) have been proposed.

Advertisement delivery method (1): Advertisement delivery method where a user listens to a voice advertisement before speaking, then the user can speak free of charge or extremely cheaply.

Advertisement delivery method (2): Advertisement delivery method where a mobile phone or the like downloads and stores an advertisement image in advance and displays the stored advertisement image while standing by, during speaking, or during calling, then the user can speak free of charge or extremely cheaply.

Advertisement delivery method (3): Advertisement delivery method where a user calls a specific telephone number linked to an advertisement, then the user can speak free of charge.

Note that, as known art relating to the embodiments, there is the "advertisement information processing method in a portable phone system" disclosed in the following Patent Document 1. This is substantially the same as the advertisement delivery method (2).

Patent Document 1: Japanese Laid-open Patent Publication No. 2001-186575

The above advertisement delivery method (1) has the inconvenience that the user cannot start to speak until after listening to the voice advertisement played before speaking. Therefore, he or she cannot start conversing immediately after making a call.

The above advertisement delivery method (2) requires that the mobile phone or the like downloads and stores an advertisement in advance. Therefore, the size of the advertisement image ends up being limited to a size able to be stored in a mobile phone or the like. The same advertisement image will be repeatedly displayed many times over the course of a long telephone conversation. Further, such an advance storage method is not suited for delivery of advertisements—which demands real time flexibility. Further, it is necessary for advertisement images to be downloaded constantly even when the subscriber is not making a telephone call, so traffic is generated regularly. Therefore, the communication fee for downloading these advertisement images has to be borne by the subscriber or the carrier.

The above advertisement delivery method (3) has the inconvenience in that it is applied to a situation in which a call is destined only for a specific telephone number linked to an advertisement, so cannot be applied to calls to unspecified parties who are not advertisers.

SUMMARY

Accordingly, an object of one aspect of the embodiments is to address the above inconvenient points and provide an advertisement delivery system that is capable of simultaneous and immediate delivery of an advertisement when a user makes a phone call and, further, is capable of real time delivery of an advertisement not dependent on downloading in advance and, still further, is capable of delivery of an advertisement to any users so long as they have contracted for the service.

Note that, this assumes that the user (subscriber) is using a telephone terminal provided with a video reproduction device—either built-in or separate-, for example, is using a telephone with a built-in TV function or a telephone terminal provided near a personal computer (PC). This is because the advertisements are delivered by video (moving image or still image).

According to the embodiments, there is provided an advertisement delivery system which is provided with: a call control apparatus, arranged in a network accommodating at least telephone terminals capable of video reproduction, for controlling calls between a sending side telephone terminal (or communication device) and a receiving side telephone terminal (or communication device); and an advertisement delivery apparatus which delivers advertisement information in the network. Further, inside the network, there are provided:

a status monitoring function unit for monitoring a "voice media state" and "video media state" of the sending side telephone terminal, at time of transition of status of the sending side telephone terminal; and a delivery connection function unit for judging whether the "voice media state" is "busy" or "available" or whether the "video media state" is "busy" or "available" and, when judging the "voice media state" to be "busy" and the "video media state" to be "available", establishing a communication session between the sending side telephone terminal and the advertisement delivery apparatus so as to deliver the advertisement information to the sending side telephone terminal.

Further, according to the embodiments, there is provided a call control apparatus which forms, together with an advertisement delivery apparatus that delivers advertisement information within a network, an advertisement delivery system and is arranged in the network accommodating at least a telephone terminal capable of video reproduction to control calls between a sending side telephone terminal (or communication device) and a receiving side telephone terminal (or communication device). This call control apparatus is provided with a status monitoring function unit for monitoring a "voice media state" and "video media state" of the sending side telephone terminal at time of startup of the sending side telephone terminal and a delivery connection function unit for, when judging that the "voice media state" is "busy" and the "video media state" is "available", establishing a communication session between the sending side telephone terminal and the advertisement delivery apparatus to deliver the advertisement information to the sending side telephone terminal.

Further, according to the embodiments, there is provided an advertisement delivery method of a system which is provided with a "call control apparatus", arranged in a network accommodating at least a telephone terminal capable of video reproduction, to control calls between a sending side telephone terminal (or communication device) and a receiving side telephone terminal (or communication device) and with an "advertisement delivery apparatus" for delivering advertisement information in the network. Here, this advertisement delivery method comprises steps of:

monitoring, at a time of transition of status of the sending side telephone terminal, a "voice media state" and a "video media state" of the sending side telephone terminal, judging whether the "voice media state" is "busy" and the "video media state" is "available", and establishing, when the judgment in the judgment step is not "negative", a communication session between the sending side telephone terminal and the advertisement delivery apparatus in order to deliver the advertisement information to the sending side telephone terminal.

According to the embodiments, it is possible to overcome the inconvenience of the above advertisement delivery method (1) and eliminate the chore of the user having to listen to a voice advertisement for a certain period of time before beginning normal telephone conversation.

It is possible to overcome the inconvenience of the above advertisement delivery method (2) and stop inefficient traffic for downloading advertisement contents in advance. Further, it is possible to eliminate the inefficient use of memory due to the constant storage of this in the telephone terminal. Further, because advertisements are delivered in real time, this is suited for timely commercial advertisements, for example, when the advertisers seek to sell immediately.

It is possible to overcome the inconvenience of the above advertisement delivery method (3) and enable all subscribers to receive delivery of advertisements through subscription and obtain perks such as discounts of telephone charges in return.

BRIEF DESCRIPTION OF DRAWINGS

FIG. 4 is a view illustrating a general configuration of an advertisement delivery apparatus 13.

FIG. 5 is a view illustrating a general configuration of a telephone terminal 14.

FIG. 19 is a flowchart illustrating an advertisement delivery method

DESCRIPTION OF EMBODIMENTS

Figure 1:
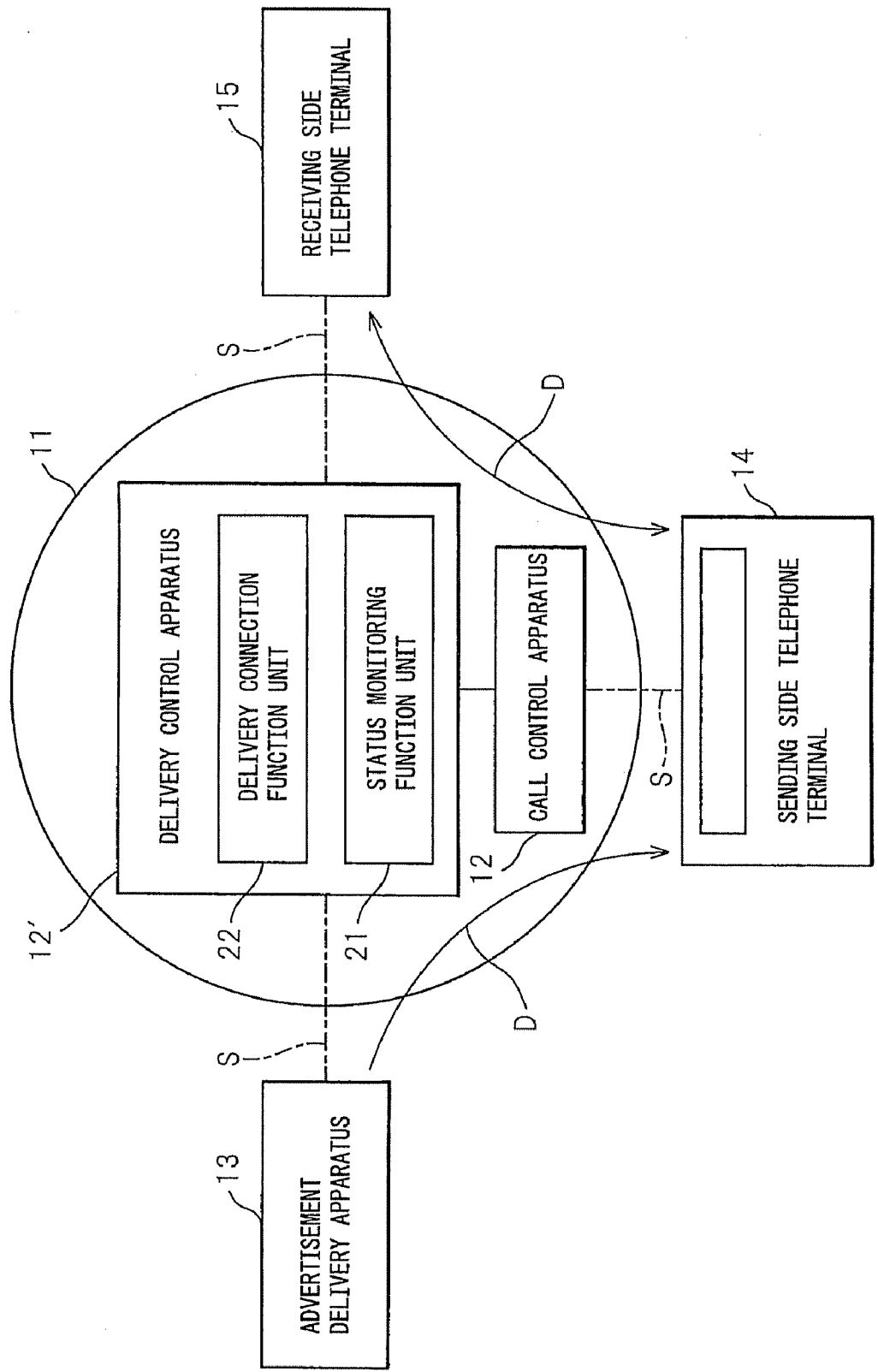
FIG. 1 is a view illustrating an advertisement delivery system according to a first aspect of the embodiments.

FIG. 1 is a view illustrating an advertisement delivery system according to a first embodiment. Notation 10 in the drawing indicates the advertisement delivery system overall. Note that, in the drawing, the dotted line indicates the flow of a signaling signal S, and the solid lines indicates the flow of data D going through a router (the same hereinafter).

In this advertisement delivery system 10, a delivery control apparatus 12' is arranged in a network 11 accommodating at least a telephone terminal capable of video reproduction and controls calls between a sending side telephone terminal 14 or communication device (13 etc.) and a receiving side telephone terminal 15 or communication device (13 etc.) The advertisement delivery apparatus 13 delivers advertisement information in the network 11.

Here, the delivery control apparatus 12' comprises a status monitoring function unit 21 and a delivery connection function unit 22. The status monitoring function unit 21 is a function unit for monitoring the "voice media state" and "video media state" of the sending side telephone terminal 14 at time of transition of status at the sending side telephone terminal 14.

Further, the delivery connection function unit 22 is a function unit for judging if the "voice media state" is "busy" or "available" and if the "video media state" is "busy" or "available". When it is decided that the "voice media state" is "busy" and the "video media state" is "available", it establishes a communication session between the sending side telephone terminal 14 and the advertisement delivery apparatus 13 in order to deliver the advertisement information to the sending side telephone terminal 14.

Note that, in for example a TV telephone (14), the "voice media state" means both the state when the voice function portion is being "available/unavailable" and the state when it is "busy/idle". Further, the "video media state" means both the state when the video function portion is being "available/unavailable" and the state when it is "busy/idle".

Figure 2:
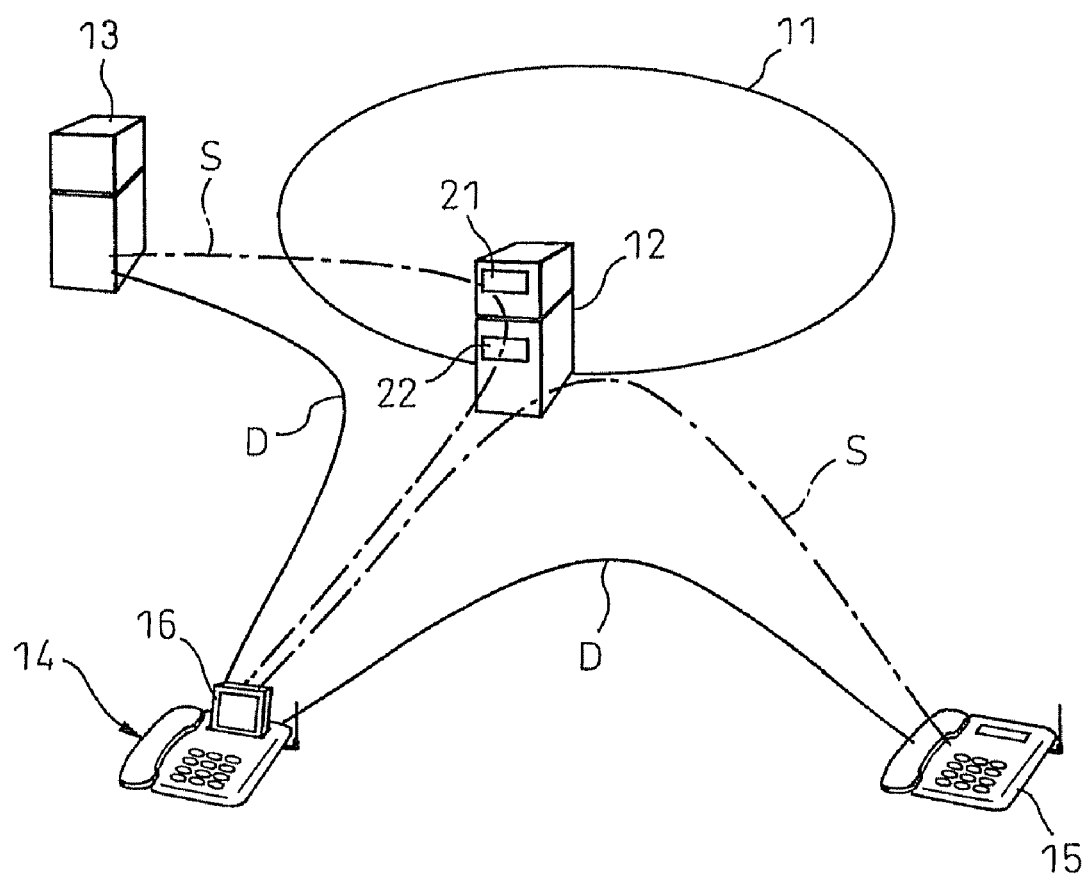
FIG. 2 is a view illustrating the advertisement delivery system of FIG. 1 with a specific image.

FIG. 2 is a view illustrating the advertisement delivery system of the FIG. 1 with a specific image. Although, in FIG. 1, the status monitoring function unit 21 and delivery connection function unit 22 are arranged inside the delivery control apparatus 12', but preferably the status monitoring function unit 21 and delivery connection function unit 22 are arranged inside the call control apparatus 12.

Note that, as an example of a delivery control apparatus 12', there is the case of the configuration illustrated in FIG. 12 mentioned later. In such an advertisement delivery system 10, the call control apparatus 12 mainly carries out voice communication sessions and an additional service control apparatus 72 is provided which mainly carries out communication sessions of advertisement delivery. Here, the status monitoring function unit 21 and delivery connection function unit 22 are arranged inside the additional service control apparatus 72. This additional service control apparatus 72 corresponds to the delivery control apparatus 12'.

Referring to FIG. 2, the call control apparatus 12 is newly provided with the status monitoring function unit 21 and delivery connection function unit 22. These function units 21 and 22 make up the advertisement delivery system 10 in the IP telephone network. These are summarized below.

Generally, when a telephone service user engages in voice-only communication with a telephone terminal 14 capable of video reproduction, a reproduction device 16 thereof capable of video reproduction is unused and available. Therefore, means (21, 22) are introduced for establishing, under the guidance of the call control apparatus, an advertisement delivery communication session with the advertisement delivery apparatus 13 when the reproduction device 16 is available and beginning delivery of moving images, still images, and other advertisement information to the telephone terminal 14 capable of video reproduction. According to this embodiment, there are the following advantages compared to the related art.

Both telephone communication and advertisement reception are simultaneously possible, so it is possible to continue conversing with the called side even while receiving an advertisement.

Real time delivery of an advertisement is possible, so this is suited for advertisements demanding a real time nature.

Traffic due to advertisement delivery is generated only when the telephone communication traffic of the subscriber is started, and therefore, as long as there is no telephone communication, advertisement traffic is not needlessly generated.

Delivery of advertisements is possible no matter whether the called side is a general fixed telephone, mobile phone, international telephone, IP telephone, corporation, etc. Note that, while not depicted in FIG. 2, the network 11 is connected through a gateway (GW) to a public switched telephone network (PSTN) or mobile phone network.

This advertisement delivery system 10 envisions that advertisement fees will be collected from the advertisement provider based on the time that advertisements are delivered. Whether advertisements are delivered only to the sending parties bearing the telephone communication fee or whether advertisements are delivered irrespective of the sending parties and receiving parties, depends on the service model of the carrier. However, in the embodiments, information for identifying sending parties and receiving parties can be added to voice media state information which is managed by the call control apparatus 12. Therefore, by using this identification information of sending parties/receiving parties, the embodiments can be adapted to any service model. Note that, the embodiments are explained using, as an example, a telephone service which delivers advertisements only to the sending parties.

Next, among the main elements depicted in FIG. 2, that is, the call control apparatus 12, advertisement delivery apparatus 13, and telephone terminal 14, the call control apparatus 12 according to the embodiments will particularly be explained in more detail.

Figure 3:
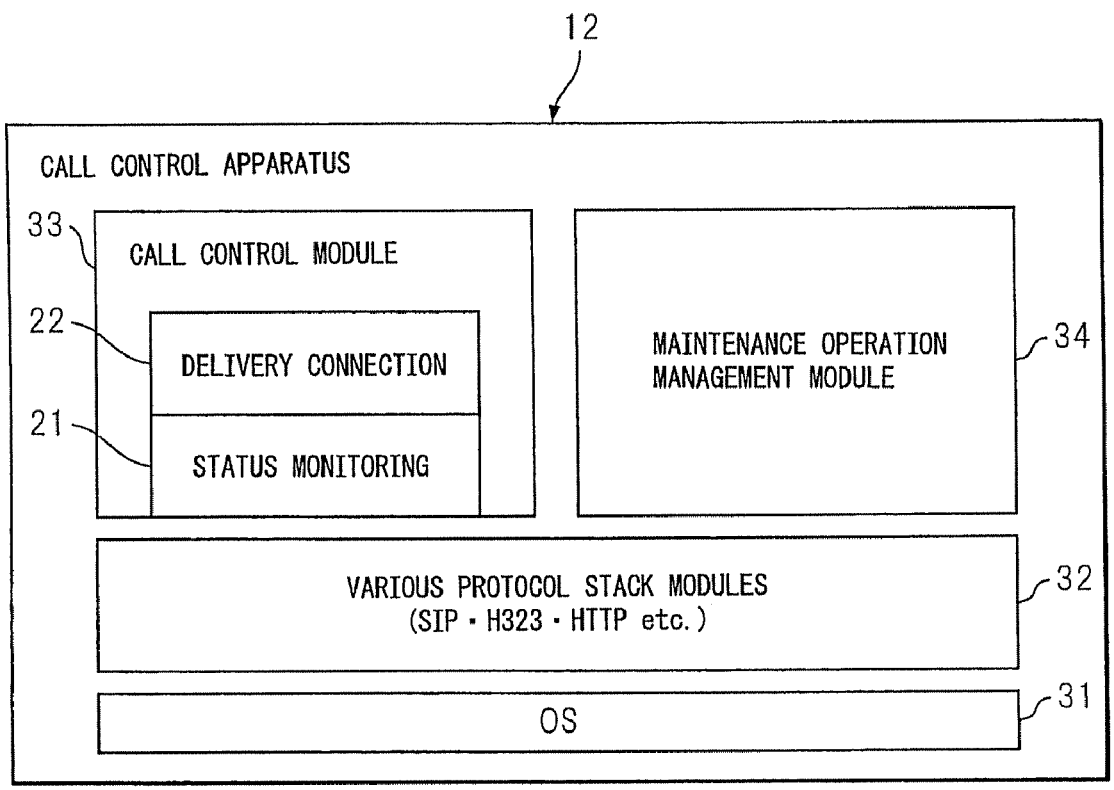
FIG. 3 is a view illustrating a general configuration of a call control apparatus 12.

FIG. 3 is a view illustrating a general configuration of the call control apparatus 12, FIG. 4 is a view illustrating a general configuration of the advertisement delivery apparatus 13, and FIG. 5 is a view illustrating a general configuration of the telephone terminal 14.

First, referring to FIG. 3, notation 31 indicates an OS (Operating System) controlling the entire apparatus, which apparatus comprises a protocol stack module 32 controlling the telephone terminals 14 and 15 under the control of the same, a call control module 33 for carrying out connection between telephone terminals, and a module 34 managing maintenance operation of the telephone terminals 14 and 15.

Referring to FIG. 4, the advertisement delivery apparatus 13 also has an OS 35 and comprises a protocol stack module 36 which manages protocols for connecting to the call control apparatus 12, a call control module 37 for connection control of the same, a module 38 for self-maintenance, and a module 39 for managing advertisement content.

Referring to FIG. 5, similar to the above, the apparatus comprises an OS 41, protocol stack module 43, and call control module 45. Further, the telephone terminal 14 (FIG. 2) having a video reproduction device 16 is provided with a codec module 42 for coding/decoding of voice information and video information, a module 44 for controlling a microphone, camera, or other device, and a module 46 serving as a keypad, switch, or other user interface.

Figure 6:
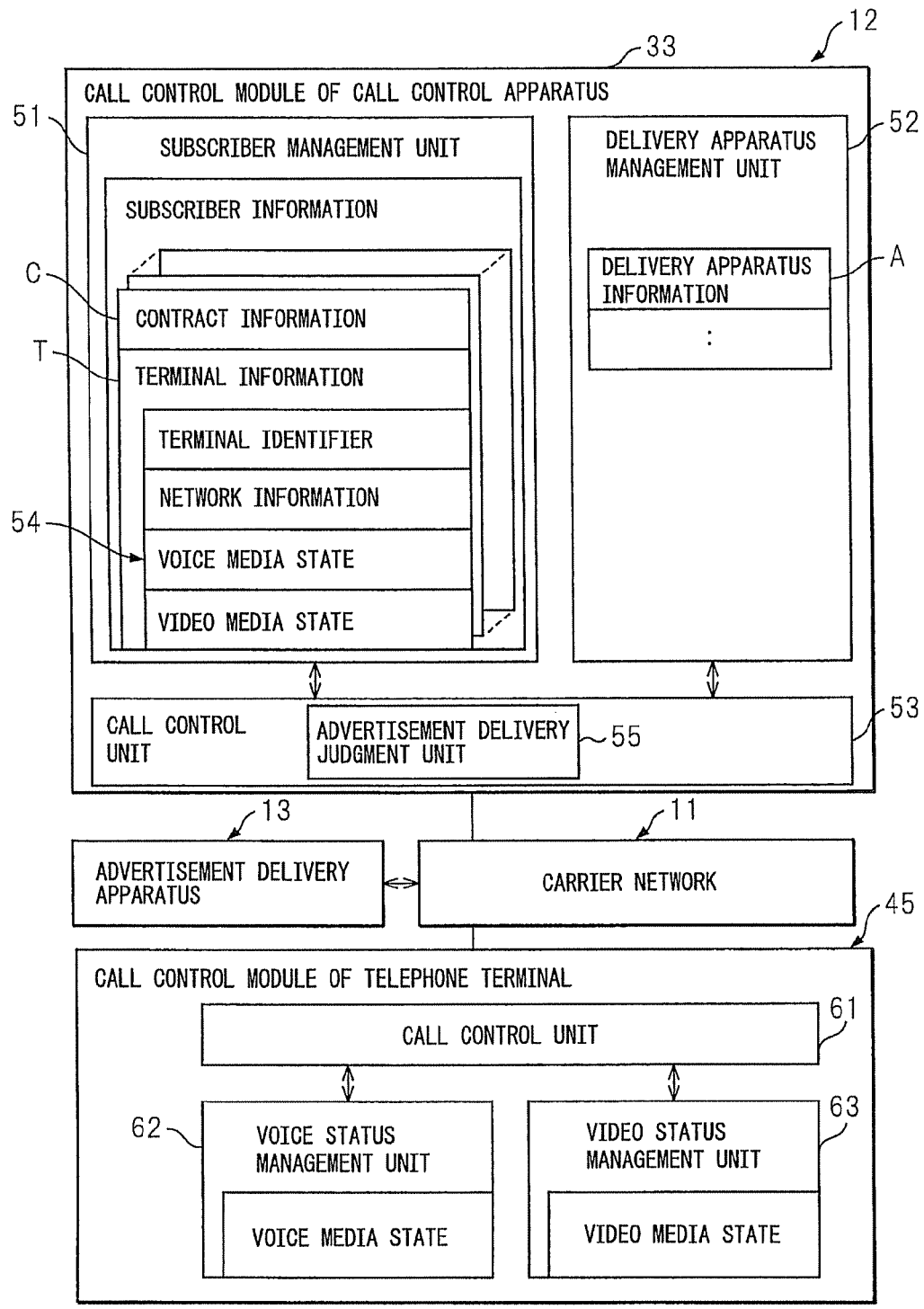
FIG. 6 is a view illustrating the details of a module 33 in FIG. 3 and a module 45 in FIG. 5.

FIG. 6 is a view illustrating the details of the module 33 and module 45 in FIG. 4. Viewing the module 33 of FIG. 6, the status monitoring function unit 21 is formed by a subscriber management unit 51 in the call control apparatus 12, which unit 51 manages the subscriber information for each subscriber. Here, the subscriber management unit 51 further has an information area 54, as subscriber information, for storing information relating to the above "voice media state" and "video media state".

On the other hand, the delivery connection function unit 22 is formed by a call control unit 53 which mainly controls calls in the call control apparatus 12. Here, the call control unit 53 further comprises an advertisement delivery judgment unit 55 which executes specified judgments.

When the telephone terminal 14 capable of video reproduction is going into "busy", the advertisement delivery judgment unit 55 judges whether a predetermined condition for beginning delivery of advertisements is satisfied. When satisfied, delivery of advertisements to the telephone terminal 14 begins.

Further, the delivery apparatus management unit 52 stores delivery apparatus information for the advertisement delivery apparatus 13.

On the other hand, the call control module 45 at the lower end of FIG. 6 is provided with a call control apparatus 61, and a voice status management unit 62 and video status management unit 63 which store the "voice media state" information and "video media state" information respectively. Note that, the call control module 45 in the drawing is depicted as a telephone terminal having both a voice function and a video function, for example, a TV telephone.

While referring to FIG. 6, the operations of the call control apparatus 12 and telephone terminal 14 will be explained in detail next.

<Call Control Apparatus 12>

The "contract information" area manages the information C of the service contract agreed upon between the communication service provider managing the call control apparatus 12 and the communication service contract user. In the embodiments, the service contract information C includes contract information indicating whether a subscriber subscribes to an advertisement delivery service.

The "terminal information T" area manages terminal identifiers (telephone number and URL) for separately managing telephone terminals 14 and 15, network information (IP address, port number, etc.) necessary in communication with a terminal, and voice and video communication media states.

The "voice media state" area manages the voice media state of the telephone terminal 14 which the subscriber uses (including information for identifying sending parties or receiving parties in some cases).

The "video media state" area manages the video media state of the telephone terminal 14 which the subscriber uses (including information for identifying TV telephone or video advertisement in some cases).

The "delivery apparatus information A" area manages the network information (IP address, port number, etc.) necessary for communication with the advertisement delivery apparatus 13.

Each time the communication media state of the subscriber is changed, the advertisement delivery judgment unit 55 judges if the condition for beginning delivery of advertisements (FIG. 10) is satisfied. When the condition for beginning delivery of advertisements is satisfied, it begins connections for the advertisement delivery communication session. Further, it also judges if the condition for ending delivery of advertisements (FIG. 11) is satisfied. When the condition for ending delivery of advertisements is satisfied, it disconnects the advertisement delivery communication session.

<Telephone Terminal 14>

The "voice media state" part (62) manages the voice media state of the telephone terminal 14. When the voice media becomes available or when it becomes unavailable, this part notifies the "voice media state" to the call control apparatus 12. As availability and unavailability identification information, "open" or "close", "TRUE" or "FALSE", "online" or "offline", etc. may be used for example.

Note that, a method may also be used wherein the maintainer of the call control apparatus 12 registers the voice media availability status in advance in the subscriber management unit 51 of the call control apparatus 12 without notifying the "voice media state" to the call control apparatus 12 from the terminal 14.

The "video media state" part (63) manages the video media state of the telephone terminal 14. When the video media becomes available or when it becomes unavailable, this part notifies the "video media state" to the call control apparatus 12. As availability and unavailability identification information, "open" or "close", "TRUE" or "FALSE", "online" or "offline", etc. may be used for example.

Note that, a method may also be used wherein the maintainer of the call control apparatus 12 registers the video media availability status in advance in the subscriber management unit 51 of the call control apparatus 12 without notifying the "video media state" to the call control apparatus 12 from the terminal 14.

Next, the operations in the advertisement delivery system 10 of FIG. 2 will be explained in detail while referring to the drawings.

Figure 7:
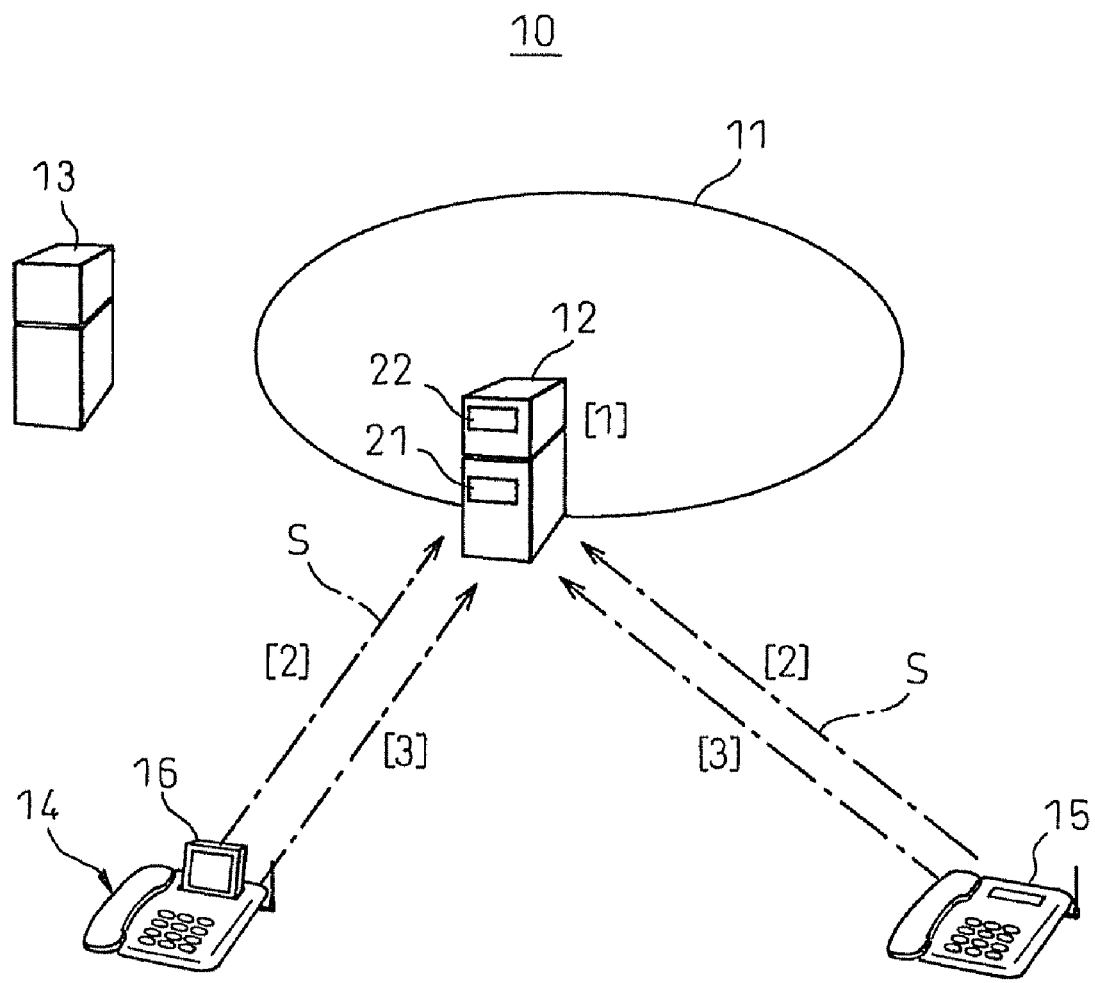
FIG. 7 is a view explaining the operations at the time of registration of position and registration of communication media status.
Figure 8:
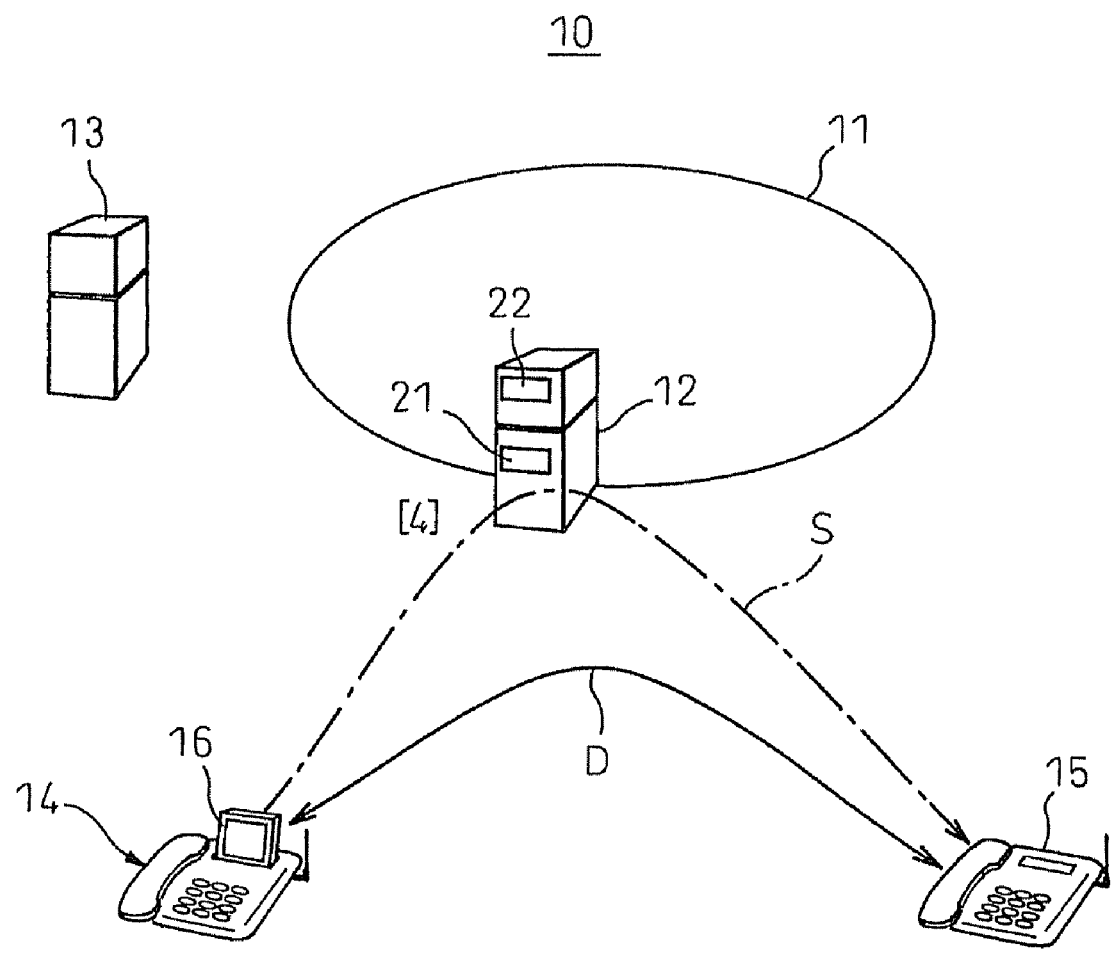
FIG. 8 is a view explaining the operations at the time of voice connection.
Figure 9:
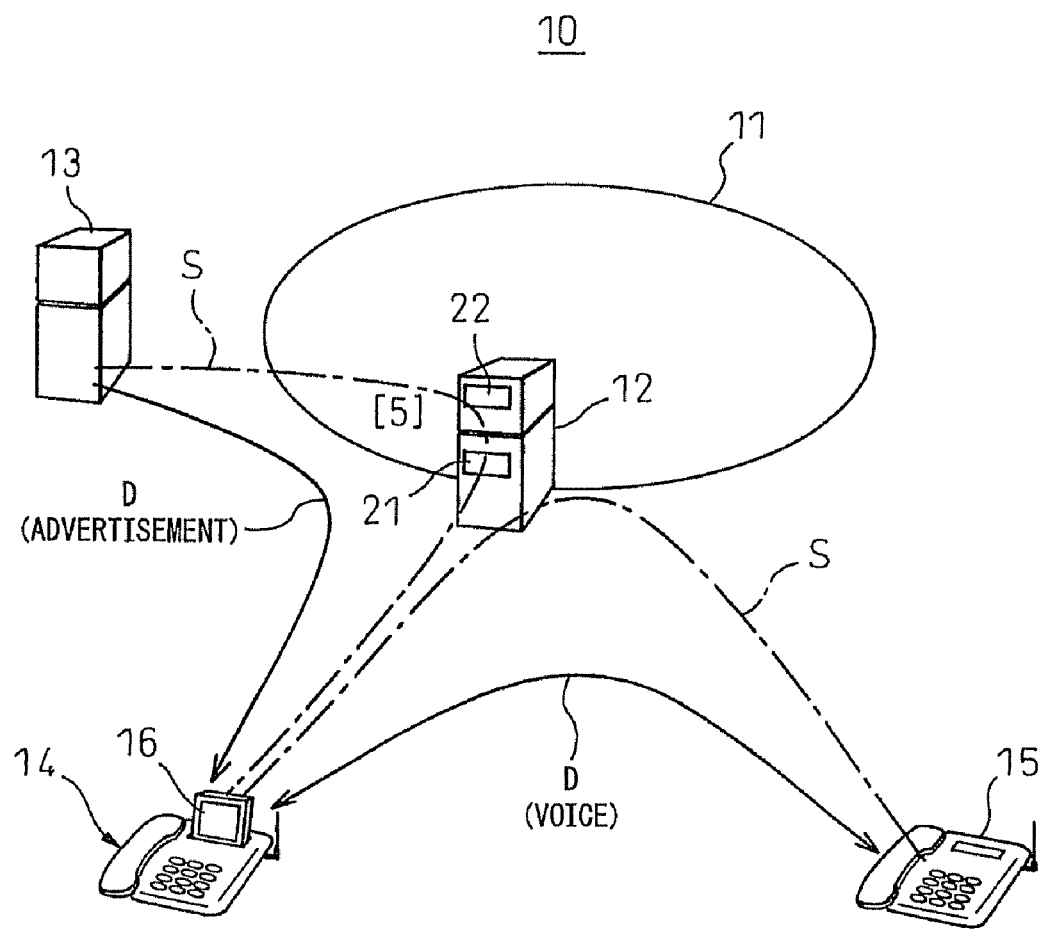
FIG. 9 is a view explaining the operations at the time of delivery of advertisements.

FIG. 7 is a view explaining the operations at the time of registration of position and registration of communication media status, FIG. 8 is a view explaining the operations at the time of voice connection, and FIG. 9 is a view explaining the operations at the time of delivery of advertisements.

First, referring to FIG. 7,

[1] Network information necessary for communication with the advertisement delivery apparatus 13 is registered in the call control apparatus 12.

[2] Network information necessary for communication with the telephone terminal 14 is registered in the call control apparatus 12 from the terminal 14.

[3] When the terminal 14 is starting up, the "availability" of the "voice media state" and "video media state" is notified to the call control apparatus 12 from the terminal 14. As this notification means, if for example using an SIP (Session Initiation Protocol), a PUBLISH method or the like may be used. Also, using an HTTP (Hyper Text Transfer Protocol) POST method or the like is also conceivable. The format of notification at this time, if for example using the PUBLISH method, may be a PIDF (Presence Information Data Format) or the like.

Note that, a method is also conceivable wherein the maintainer of the call control apparatus 12 registers the communication media availability status in advance in the subscriber management unit 51 of the call control apparatus 12 without notifying the voice and video communication media status to the call control apparatus 12 from the terminal 14.

Next, referring to FIG. 8 (voice connection), [4] If a voice-only call is made to a receiving side telephone terminal 15 from a sending side telephone terminal 14 capable of video reproduction, connection processing is carried out in the call control apparatus 12 between the sending terminal 14 and the receiving terminal 15. As this connection means, an SIP, for example, may be used. If voice connection is carried out, the "voice media state" of the subscriber (14) shifts from "available" to "busy".

Figure 10:
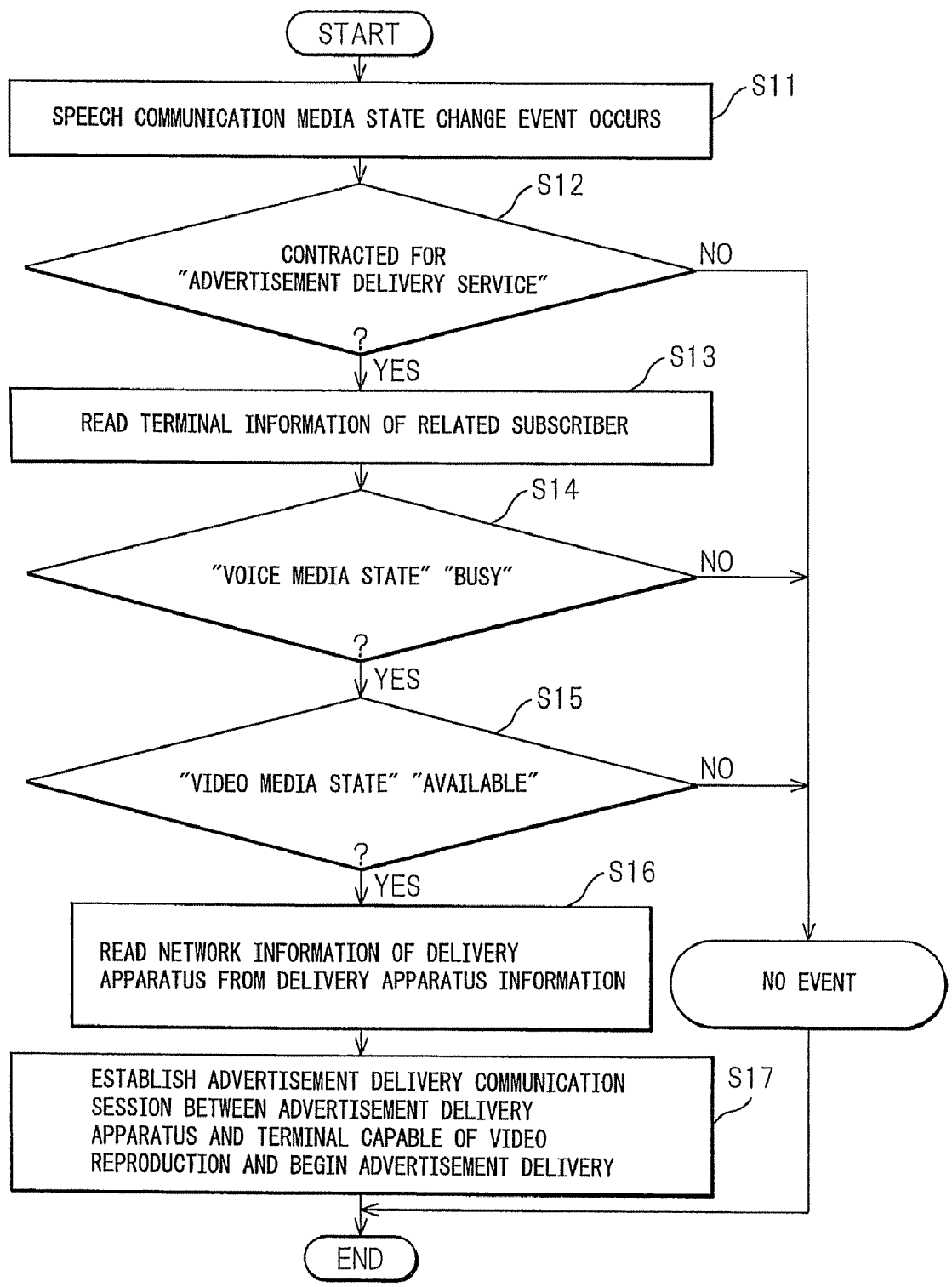
FIG. 10 is a flowchart illustrating the processing for judgment of the condition for beginning delivery of advertisements.

Further, referring to FIG. 9 (advertisement delivery),

[5] When a voice telephone communication event occurs, judgment, according to the flow of FIG. 10, is carried out at the advertisement delivery judgment unit 55 on whether the condition for beginning delivery of advertisements is satisfied. If it is judged that the condition for beginning delivery of advertisements is satisfied, an advertisement delivery communication session is established, under the guidance of the call control apparatus, between the advertisement delivery apparatus 13 and the terminal 14 capable of video reproduction, and advertisements begin to be delivered. As means for establishing an advertisement delivery communication session, the SIP may be used for example. The advertisement delivery content delivered through the advertisement delivery communication session, if a still image, may be delivered by a JPEG, GIF, BITMAP, PDF, or other standard image format using UDP, HTTP, or FTP. If a moving picture, it may be delivered by an MPEG2, MPEG4, AVI, or other moving picture format using UDP, RTP, or RTSP.

The basic series of operations [1] to [5] of delivery of advertisements is carried out as set forth above. However, various communication situations arise in practice, so it is necessary to adapt to such changes in communication states. Two examples are explained with the following [6] and [7].

[6] There are cases when a user switches from a communication state receiving advertisements to a television telephone. In this case, if the advertisement delivery communication session is disconnected from the telephone terminal 14 side, the "video media state" of the terminal 14 shifts from "busy" to "available", whereby only the voice media becomes "busy". When the video media becomes available at the terminal 14 side in such a way, afterwards, the routine for changing the communication media from the voice communication to TV telephone communication (voice+video) is carried out, by communication session for changing (for example, routine for changing an SIP session) according to the established standards.

Figure 11:
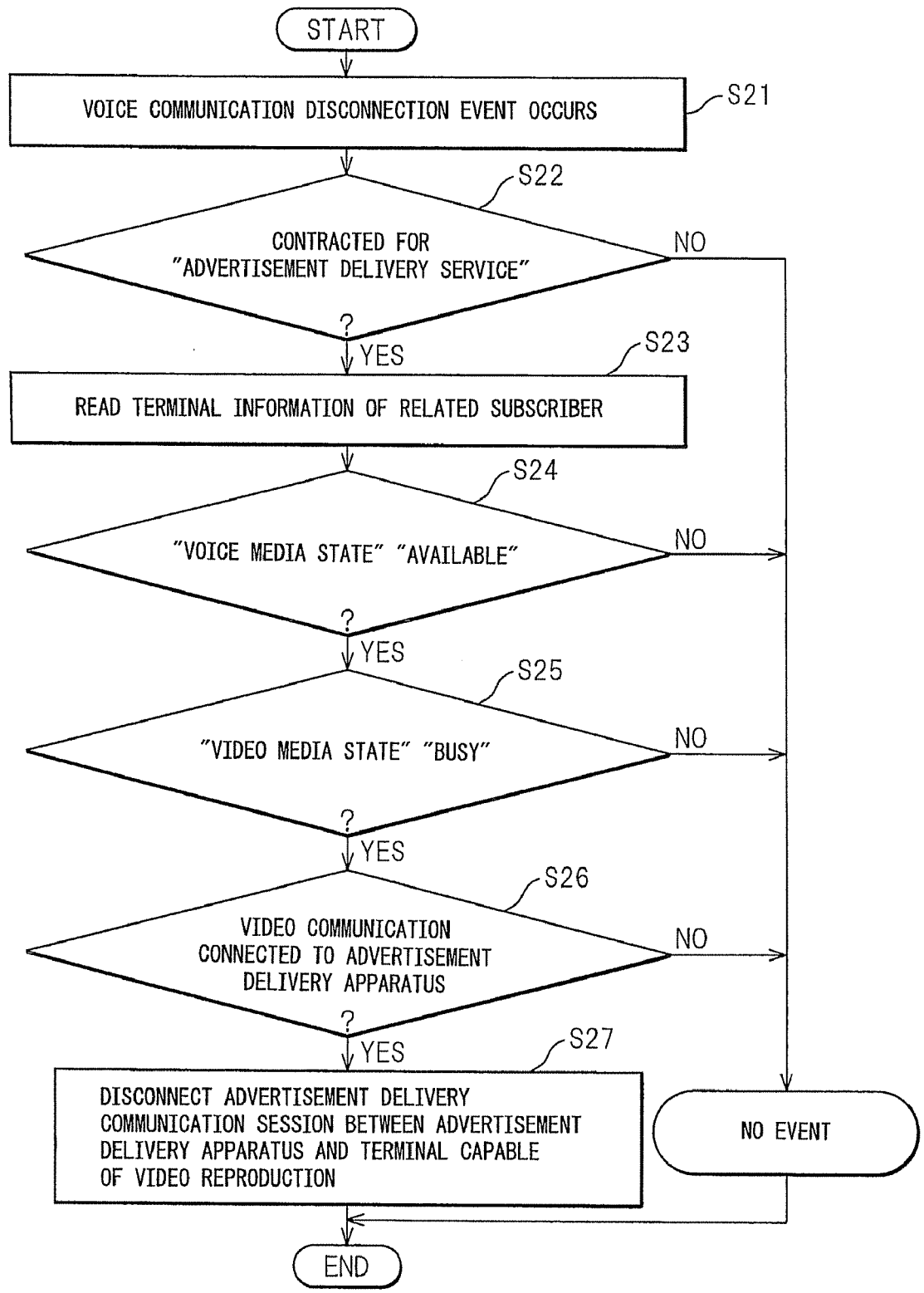
FIG. 11 is a flowchart illustrating the processing for judgment of the condition for ending delivery of advertisements.

[7] There are cases where an event of ending voice communication occurs during a state of communication for receiving advertisements. In this case, a judgement, as explained later in the flowchart of FIG. 11, is carried out by the advertisement delivery judgment unit 55 which judges whether the condition for ending delivery of advertisements is satisfied. If it is judged that the condition for ending delivery of advertisements is satisfied, the advertisement delivery communication session, which has been established under the initiative of the call control apparatus between the advertisement delivery apparatuses 13 and the terminal 14 capable of video reproduction, is disconnected and advertisements stop being delivered.

The "condition for beginning delivery of advertisements" and the "condition for ending delivery of advertisements" described here will be explained in more detail using the flowchart. As to the former condition, the advertisement delivery judgment unit 55 judges if the telephone terminal 14 capable of video reproduction satisfies, when entering "busy", the condition for beginning delivery of advertisements and, if satisfied, begins delivery of advertisements to the telephone terminal 14.

As to the latter condition, the advertisement delivery judgment unit 55 judges if the telephone terminal 14 capable of video reproduction satisfies, when exiting from the "busy" state, the condition for ending delivery of advertisements and, if satisfied, ends delivery of advertisements to the telephone terminal 14.

The condition for beginning delivery of advertisements is simultaneous satisfaction of all of the following: The telephone terminal 14
    subscribes to the "advertisement delivery service"
    has a "voice media state" which is "busy", and
    has a "video media state" which is "available".

On the other hand, the condition for ending delivery of advertisements is simultaneous satisfaction of all of the following: The telephone terminal 14
    subscribes to the "advertisement delivery service",
    has a "voice media state" which is "available", and
    has a "video media state" which is "busy".

FIG. 10 is a flowchart illustrating the processing for judgment of the condition for beginning delivery of advertisements, and FIG. 11 is a flowchart illustrating the processing for judgment of the condition for ending delivery of advertisements.

First, referring to FIG. 10, step S11: An event of changing the telephone media state occurs.

step S12: It is judged if the user has contracted for an "advertisement delivery service".

step S13: If contracting for it, the terminal information (see the contents of 51 of FIG. 6) of the subscriber (14) is read.

step S14: It is judged if the "voice media state" is "busy".

step S15: If busy, it is judged if the "video media state" is "available".

step S16: If available, the network information of the advertisement delivery apparatus 13 is read from the delivery apparatus information (A of FIG. 6).

step S17: An advertisement delivery communication session, between the advertisement delivery apparatus 13 and the telephone terminal 14 capable of video reproduction, is established and advertisements begin to be delivered.

Next, referring to FIG. 11, step S21: An event of disconnecting voice communication occurs.

step S22: It is judged if the user has contracted for an "advertisement delivery service".

step S23: If contracting for it, the terminal information (see the contents of 51 in FIG. 6) of the subscriber (14) is read.

step S24: It is judged if the "voice media state" is "available".

step S25: If available, it is judged if the "video media state" is "busy".

step S26: If busy, it is judged if the video communication is connected to the advertisement delivery apparatus 13.

step S27: The advertisement delivery communication session, between the advertisement delivery apparatus 13 and telephone terminal 14 capable of video reproduction, is disconnected.

Next, modifications of the advertisement delivery system 10 will be explained. As mentioned earlier, depending on the type of the advertisement delivery system 10, there are cases where the call control apparatus 12 which mainly carries out voice communication sessions, while separately providing an additional service control apparatus 72 which mainly carries out advertisement delivery communication sessions. Here, the status monitoring function unit 21 and delivery connection function unit 22 are provided inside the additional service control apparatus 72.

Figure 12:
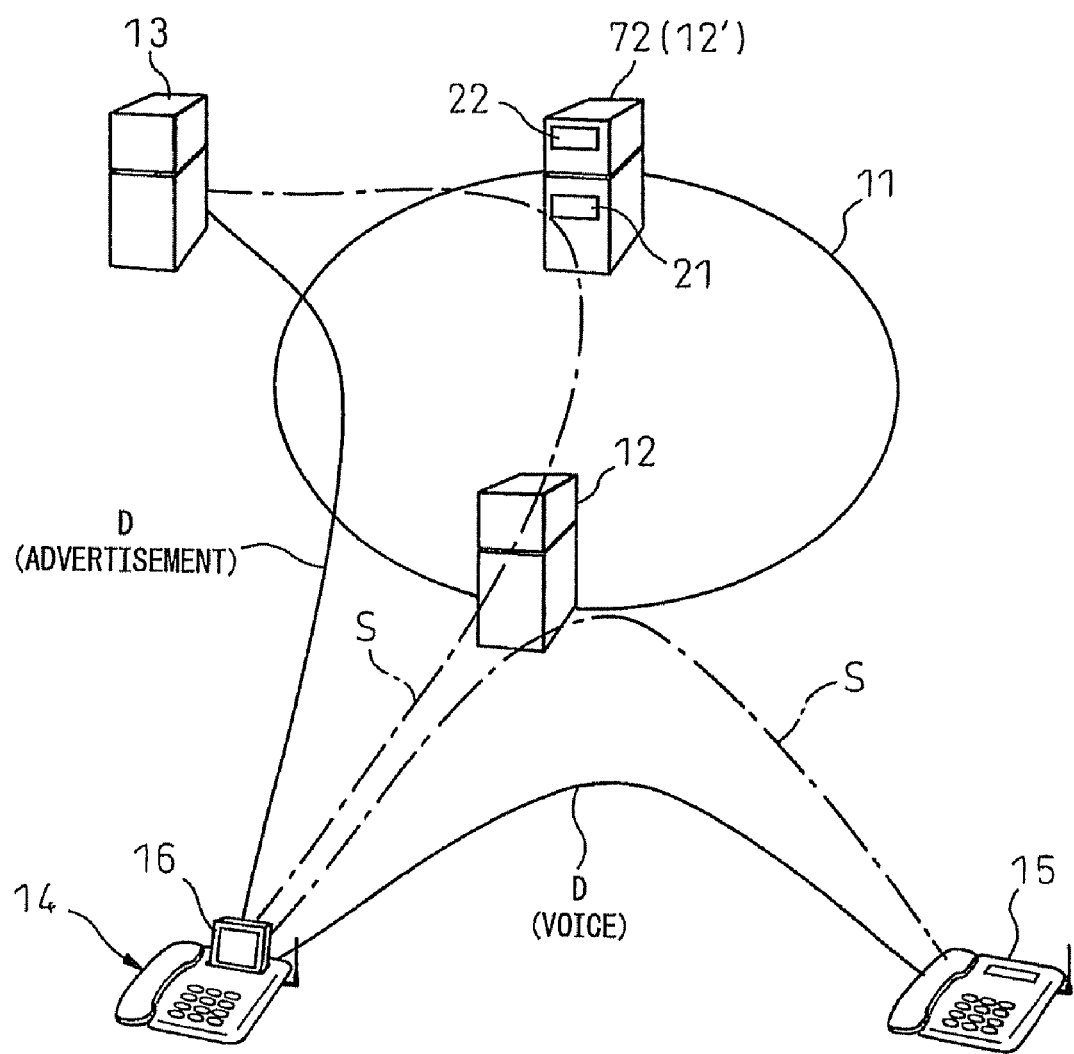
FIG. 12 is a view illustrating an advertisement delivery system provided with an additional service control apparatus.
Figure 13:
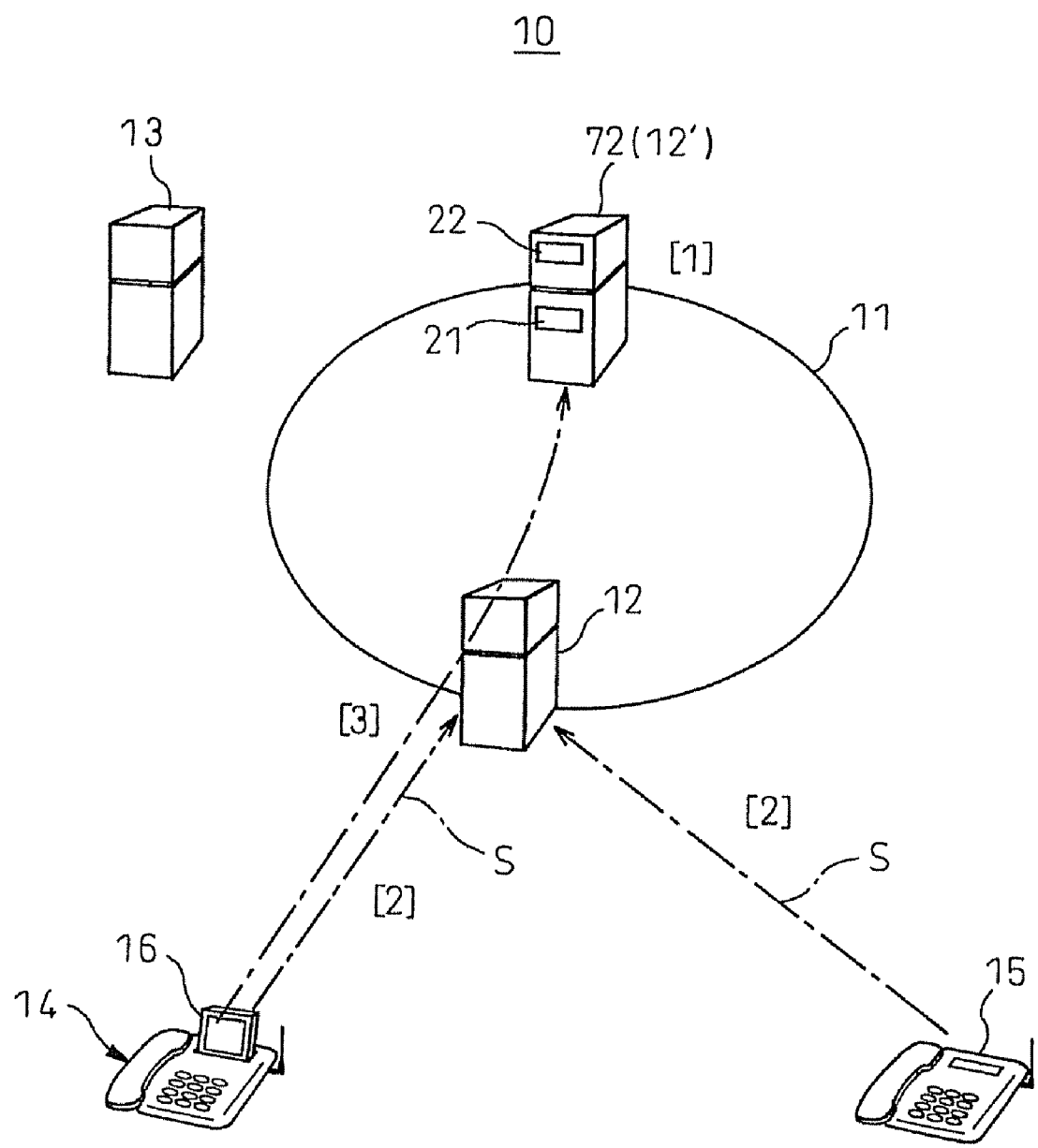
FIG. 13 is a view explaining the operations at the time of registration of position and registration of communication media status.
Figure 14:
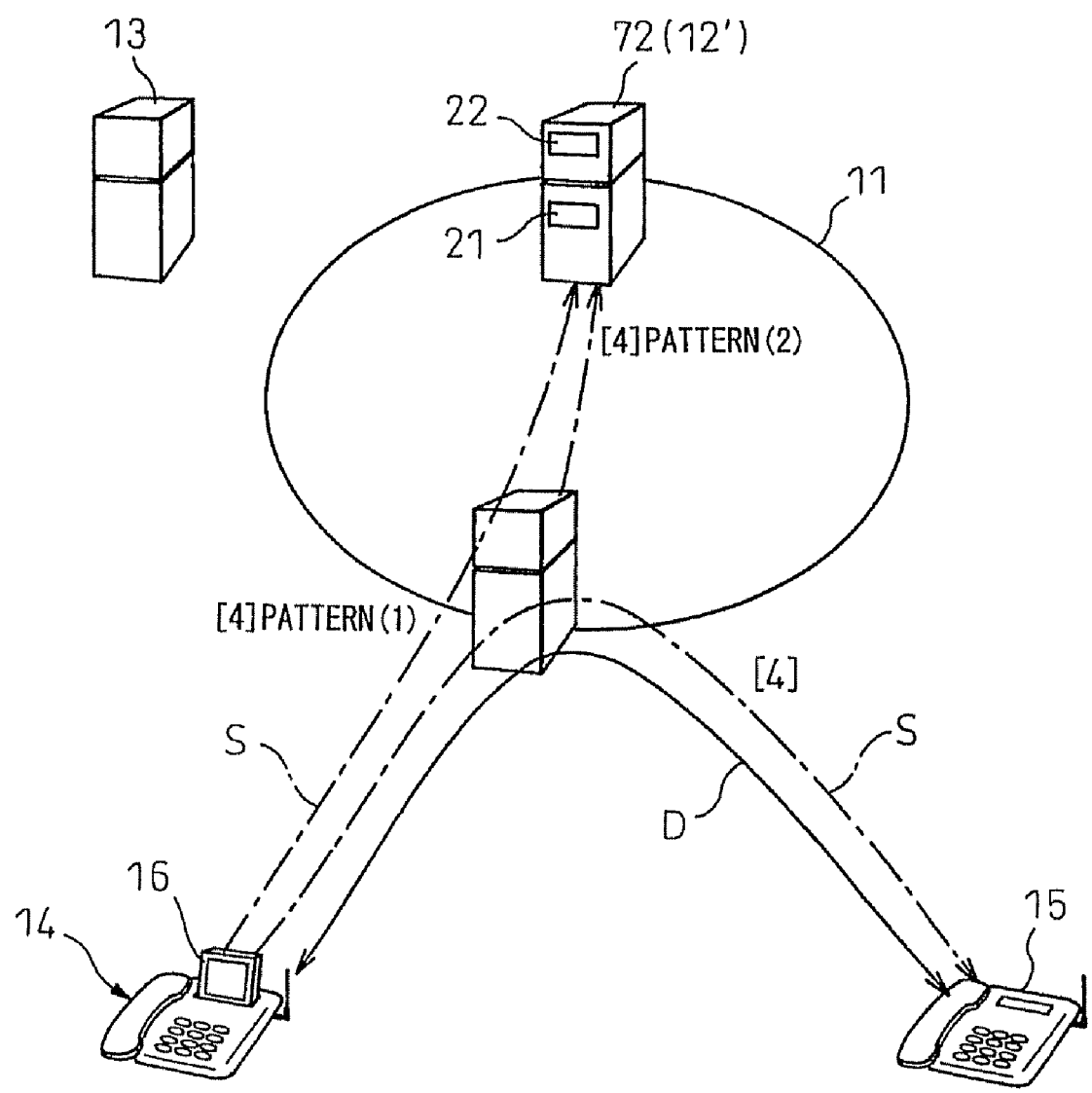
FIG. 14 is a view explaining the operations at time of voice connection and registration of communication media status.

FIG. 12 is a view illustrating an advertisement delivery system provided with an additional service control apparatus, FIG. 13 is a view explaining the operations at the time of registration of position and registration of communication media status, and FIG. 14 is a view explaining the operations at time of voice connection and registration of communication media status.

Depending on the type of the carrier, sometimes a system configuration is employed that separates the functions between the call control apparatus 12 controlling voice communication and other basic communication and an additional service control apparatus 72 (12') controlling advertisement delivery and other additional service communication. For example, referring to FIG. 12, the voice communication session is controlled only by the basic call control apparatus 12, while the advertisement delivery communication session is controlled not by the call control apparatus 12 but by the additional service control apparatus 72. In this case, when voice communication is carried out between the sending side telephone terminal 14 and receiving side telephone terminal 15, the inconvenience will occur at the additional service control apparatus 72 that the apparatus 72 cannot determine whether or not the subscriber is in the middle of voice communication.

Therefore, when the sending terminal 14 and receiving terminal 15 enter voice communication, the fact that the voice media state of the subscriber is "busy" is notified from either the terminal 14 side or the call control apparatus (12) side to the additional service control apparatus 72, thereby eliminating the above inconvenience. Specifically, this is carried out as follows.

In FIG. 13,

[1] The network information necessary for communication with the advertisement delivery apparatus 13 is registered in the additional service control apparatus 72.

[2] The network information necessary for communication with the telephone terminal 14 is registered from the terminal 14 to the call control apparatus 12.

[3] When the terminal 14 is starting up, the fact that the "voice media state" and "video media state" (see 62, 63 of FIG. 6) are "available" is notified from the terminal 14 to the additional service control apparatus 72. As the notification means at this time, the SIP, HTTP, and the like can be used for example. The notification path, in this case, may pass through the call control apparatus 12 or may go directly from the terminal 14 to the additional service control apparatus 72 without passing through the call control apparatus 12. Which one is selected is dependent on the network design of the communication service provider.

Note that, another method may be used in which the voice and video communication media states are not notified from the terminal 14 to the additonal service control apparatus 72, but the maintainer of the additional service control apparatus 72 registers the availability state of the communication media of the terminal 14 in advance to the additional service control apparatus 72.

Further, referring to FIG. 14,

[4] When a sending side telephone terminal 14 capable of video reproduction makes a voice-only call to a receiving side telephone terminal 15, the call control apparatus 12 performs processing for connection between the sending terminal 14 and receiving terminal 15. As the connection means at this time, the SIP may be used for example. Further, when the voice communication starts up normally, the fact that the subscriber "voice media state" shifts from "available" to "busy" is notified to the additional service control apparatus 72 by either of the methods of the following pattern (1) and (2).

Pattern (1): The fact that the "voice media state" is "busy" is notified from the terminal 14 to the additional service control apparatus 72. As the notification means at this time, the SIP, HTTP, and the like may be used for example. The notification path at this time may pass through the call control apparatus 12 or may go directly from the terminal 14 to the additional service control apparatus 72 without passing through the call control apparatus 12. Which one is selected is dependent on the network design of the communication service provider.

Pattern (2): The fact that the "voice media state" is "busy" is notified from the call control apparatus 12 to the additional service control apparatus 72. As the notifications means at this time, the SIP, HTTP, and the like may be used for example.

The routine after [4], similar to the above, performs processing for beginning delivery of advertisements and ending delivery of advertisements in accordance with the flow routines of FIG. 10 and FIG. 11 if an event occurs in which the communication media state changes.

<Other Embodiment 1>

In the explanation until now, the explanation was given using an example of a terminal configuration where the telephone terminal 14 for carrying out voice communication and the video reproduction terminal device 16 for carrying out video communication were formed as a single unit. However, in the following, an advertisement delivery system 10 having a terminal configuration, in which the telephone terminal and reproduction device are separate, will be explained.

Figure 15:
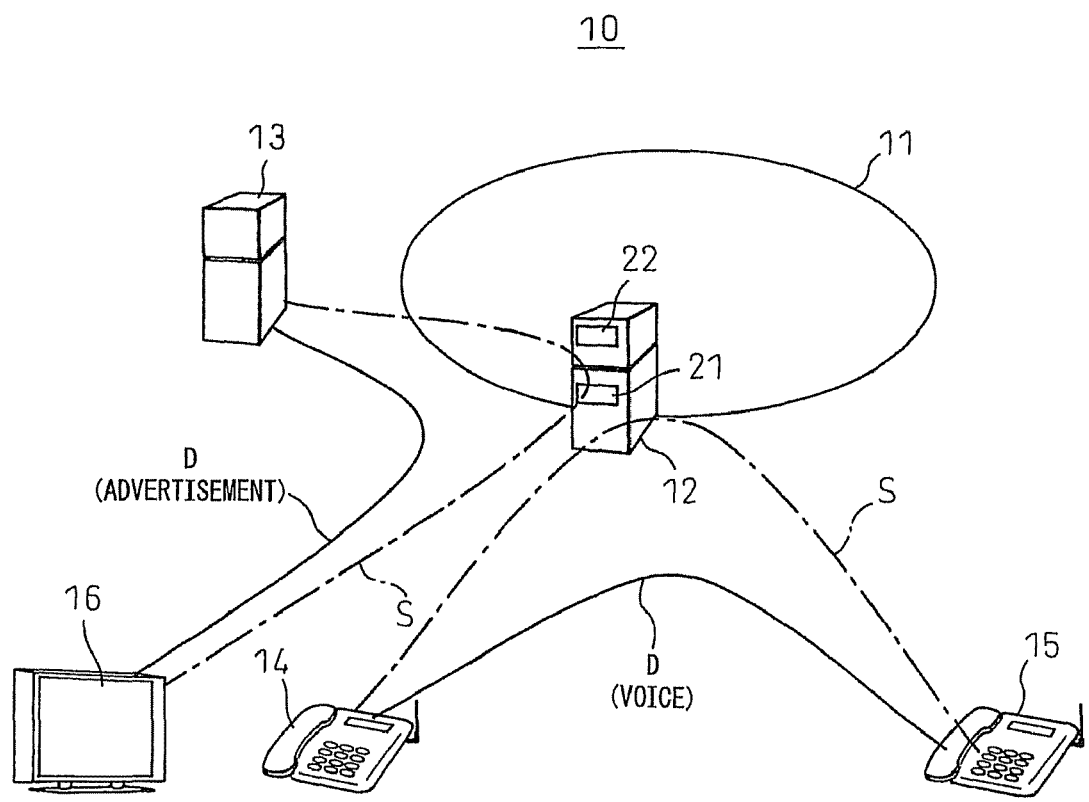
FIG. 15 is a view illustrating another embodiment 1.
Figure 16:
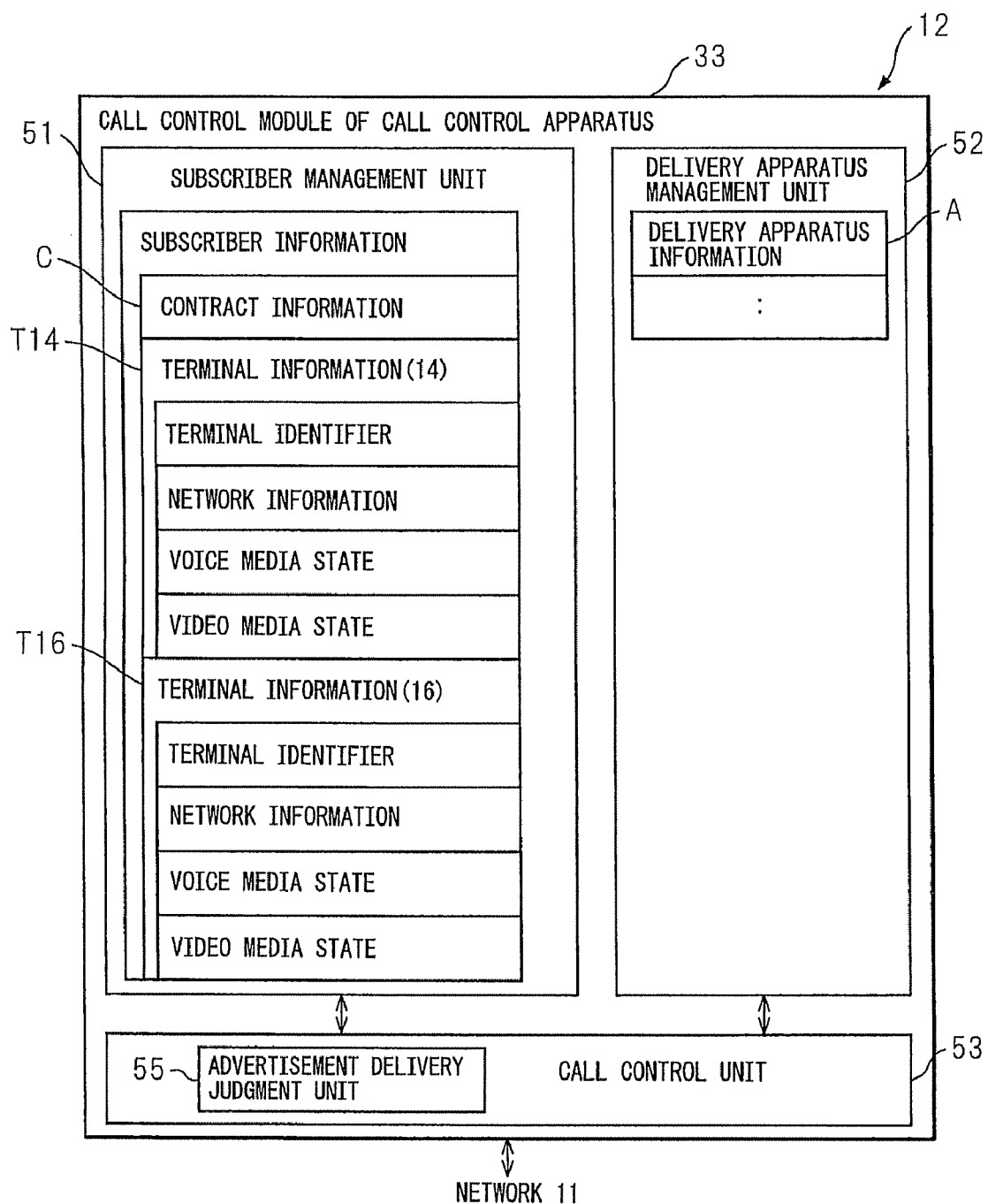
FIG. 16 is a view illustrating the configuration of the call control module 33 in the other embodiment 1.

FIG. 15 is a view illustrating another embodiment 1, and FIG. 16 is a view illustrating a configuration of the call control module 33 according to the other embodiment 1. Note that, the subscriber information portion includes a plurality of parts for the plurality of subscribers, however, only one part is depicted in the drawing for simplification (the same applies to FIG. 18 explained later).

In short, if the reproduction device 16 of the telephone terminal 14 capable of video reproduction is separated from the telephone terminal body, the subscriber management unit 51 contains, as subscriber information areas, an information area T14 corresponding to the telephone terminal 14 and an information area T16 corresponding to the reproduction device 16 separately. These information areas T14 and T16 store information relating to respective "voice media state" and "video media state" individually.

When realizing an advertisement delivery service by a terminal configuration in which the telephone terminal 14 for carrying out voice communication and the reproduction device 16 for carrying out video communication are separated like in the system configuration of FIG. 15, identifiers are separately assigned to the telephone terminal 14 and reproduction device 16 for uniquely managing the terminal side. In this case, the call control apparatus 12 manages the identifiers for the telephone terminal 14 and reproduction device 16, by linking the terminal 14 and device 16, as a group of terminals of one subscriber. Thus it is necessary, for this advertisement delivery judgment unit 55, to judge the condition for beginning delivery of advertisements and the condition for ending delivery of advertisements by referring to the terminal information T14 and T16 covering a plurality of terminals among the terminals of one subscriber.

Therefore, the subscriber management unit 51 can manage a plurality of terminal information T14, T16 for each subscriber. The advertisement delivery judgment unit 55 of the call control unit 53, when referring to the terminal information from the subscriber information of the subscriber management unit 51, refers to all of the terminal information that the one subscriber is using so as to judge the condition for beginning delivery of advertisements and condition for ending the delivery of advertisements.

<Other Embodiment 2>

Figure 17:
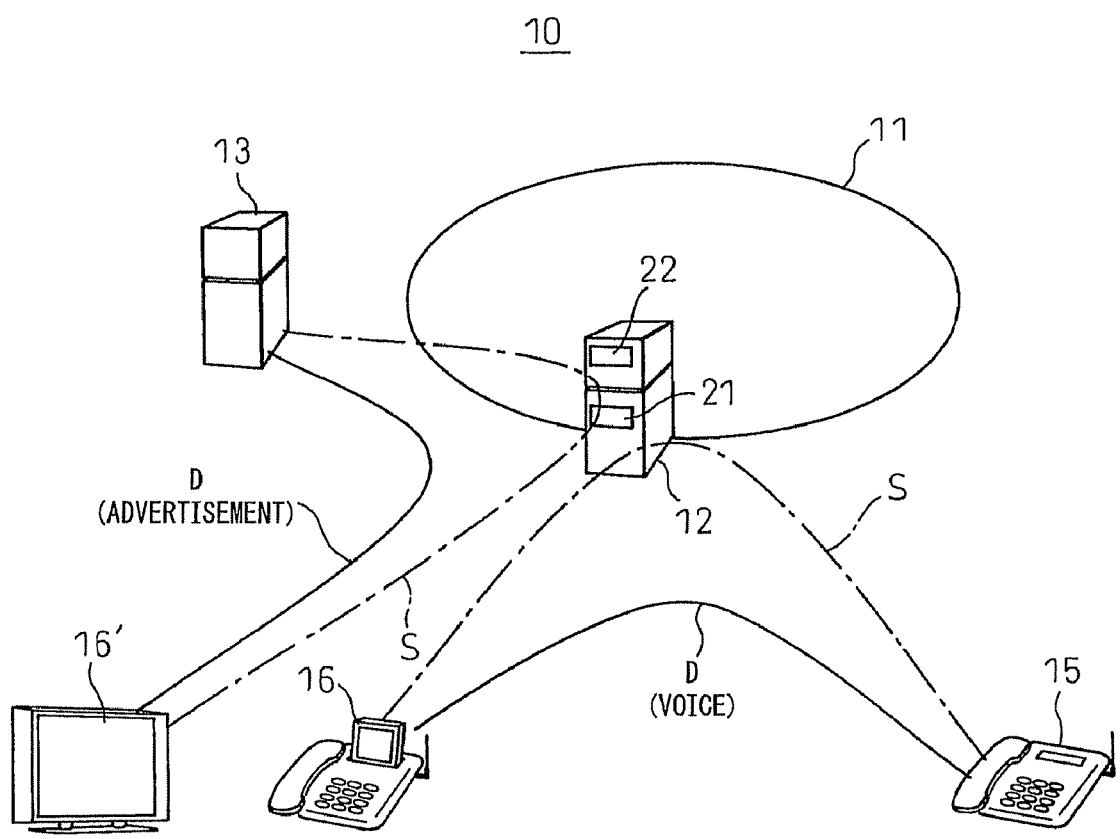
FIG. 17 is a view illustrating another embodiment 2.
Figure 18:
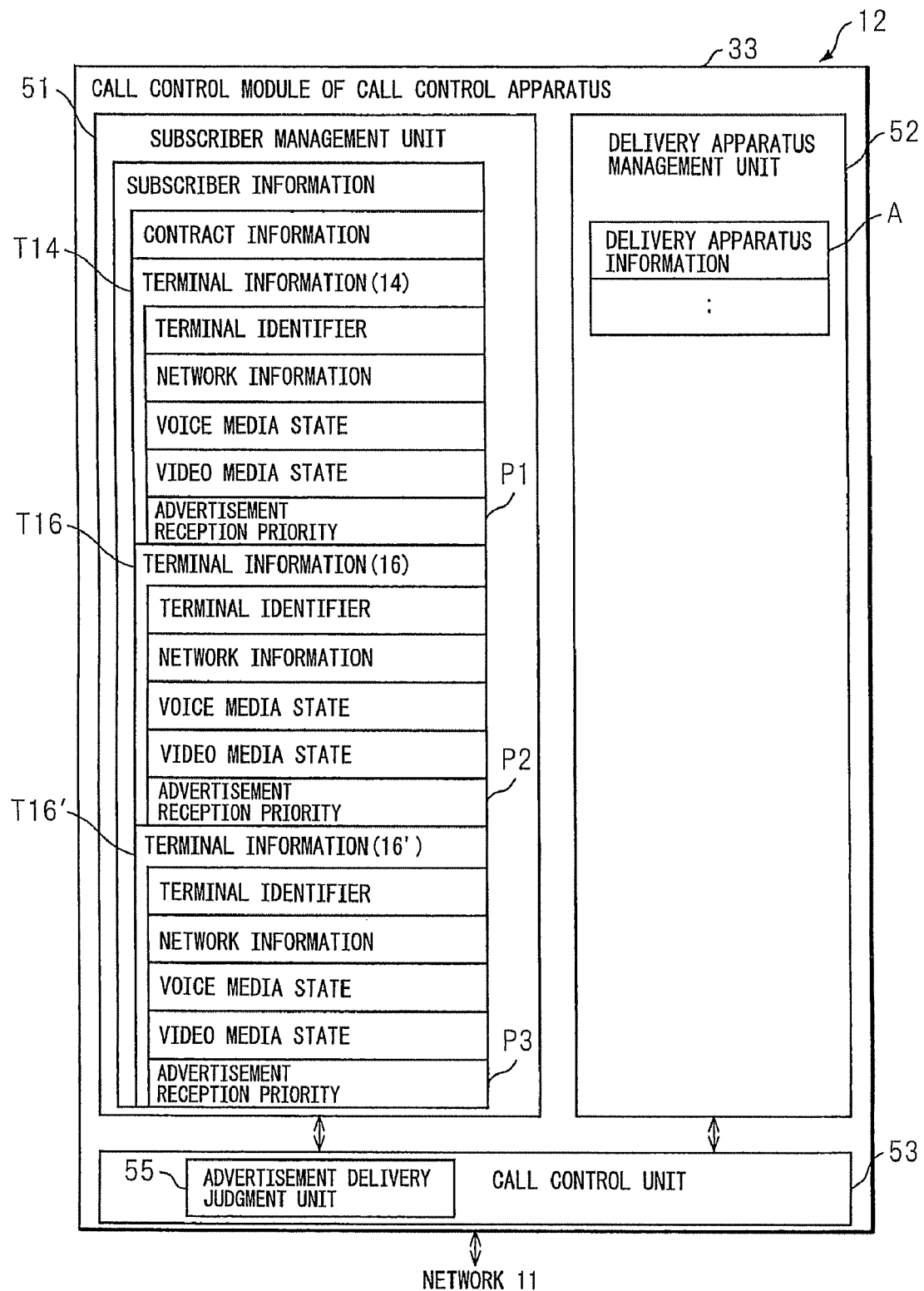
FIG. 18 is a view illustrating the configuration of the call control module 33 in the other embodiment 2.

FIG. 17 is a view illustrating another embodiment 2, and FIG. 18 is a view illustrating the call control module 33 of the other embodiment 2.

In short, when the video reproduction device of the telephone terminal 14 capable of video reproduction is combined with or separated from the telephone terminal body and there are two or more reproduction devices (16, 16') (see FIG. 17), the subscriber management unit 51 contains, as subscriber information area, an information area indicating advertisement reception priority (P1, P2, P3) which determines which of the two or more reproduction devices and telephone terminal gets priority in reception (see FIG. 18).

In a telephone terminal configuration able to use two or more devices capable of video reproduction for carrying out video communication such as in the system configuration of FIG. 17, the advertisement delivery service can be received if any of the reproduction devices is "available". However, in such a case, it is necessary to determine to which the reproduction device the advertisements should be delivered.

The subscriber management unit 51, depicted in FIG. 18 for this determination, is configured to manage a plurality of terminal information areas (T14, T16, and T16') for each subscriber and thus it assigns advertisement reception priorities P1, P2, and P3 in the terminal information areas. On the other hand, the advertisement delivery judgment unit 55 of the call control unit 53, when referring to the terminal information area in the subscriber management unit 51, refers to all the terminal information areas for the plurality of terminals and devices that the one subscriber uses so as to judge whether the condition for beginning delivery of advertisements is satisfied. The judgment unit 55 is configured so as to select, when there are a plurality of terminals and devices matching the condition for beginning delivery of advertisements, the terminal or the device with the highest priority from among a plurality of advertisement reception priorities (P1, P2, and P3).

The advertisement delivery system of the embodiments described above can be understood to be embodiments of a method or embodiments of a program.

FIG. 19 is a flowchart illustrating an advertisement delivery method according to the embodiments. In the drawing, step S31: At the time of transition of status of the sending side telephone terminal 14, the "voice media state" and "video media state" of the sending side telephone terminal 14 are monitored.

step S32: Whether the "voice media state" is "busy" and whether the "video media state" is "available" are judged.

step S33: When there is no "negative" judgment (YES) at the judgment step S32, a communication session is established between the sending side telephone terminal 14 and the advertisement delivery apparatus 13 in order to deliver the advertisement information to the sending side telephone terminal 14.

step S34: When it is judged at the judgment step S32 that the "voice media state" is "available" and the "video media state" is "busy", the established session ends.

Note that, step S30 first stores, at the time of transition of status of the sending side telephone terminal 14, the "voice media state" and "video media state" of the sending side telephone terminal 14 in the subscriber management unit 51 which manages the subscriber information of each subscriber.

The steps S30 to S34 are executed by the call control apparatus 12. Alternatively, the steps S30 to S34 are executed by an additional service control apparatus 72 (12') when an additional service control apparatus is further provided.

Further, the advertisement delivery program, stored in a computer readable medium, according to the embodiments executes the steps (i) to (iii) below in a computer. That is, (i) monitoring the "voice media state" and "video media state" of the sending side telephone terminal at the time of transition of status at the sending side telephone terminal 14, (ii) judging whether the "voice media state" is "busy" and whether the "video media state" is "available", and (iii) when there is no "negative" judgment in the judgment routine (ii), establishing a communication session between the sending side telephone terminal 14 and the advertisement delivery apparatus 13 in order to deliver the advertisement information to the sending side telephone terminal 14.

All examples and conditional language recited hereinafter are intended for pedagogical purposes to aid the reader in understanding the principles of the invention and the concepts contributed by the inventor to furthering the art and are to be construed as being without limitation to such specifically recited examples and conditions. Nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

DESCRIPTION OF NOTATIONS 10 advertisement delivery system
11 network
12 call control apparatus
12' delivery control apparatus
13 advertisement delivery apparatus
14 sending side telephone terminal
15 receiving side telephone terminal
16 reproduction device
21 status monitoring function unit
22 delivery connection function unit
33 call control module
51 subscriber management unit
52 delivery apparatus management unit
53 call control apparatus
54 information area
55 advertisement delivery judgment unit
61 call control apparatus
62 voice status management unit
63 video status management unit
72 additional service control apparatus

What is claimed is:

1. An advertisement delivery system comprising
a call control apparatus arranged in a network accommodating at least a telephone terminal capable of video reproduction and controlling a call between a sending side telephone terminal or communication device and a receiving side telephone terminal or communication device and
an advertisement delivery apparatus delivering advertisement information in the network, wherein said advertisement delivery system comprising:
a status monitoring function unit monitoring a "voice media state" and "video media state" of the sending side telephone terminal at a time of transition of status at the sending side telephone terminal; and
a delivery connection function unit judging whether the "voice media state" is "busy" or "available" and whether the "video media state" is "busy" or "available" and, when judging the "voice media state" to be "busy" and the "video media state" to be "available", establishing a communication session between the sending side telephone terminal and the advertisement delivery apparatus to deliver the advertisement information to the sending side telephone terminal.

2. The advertisement delivery system as set forth in claim 1, wherein the status monitoring function unit and the delivery connection function unit are provided inside the call control apparatus.

3. The advertisement delivery system as set forth in claim 1, wherein the call control apparatus mainly carries out voice communication sessions and comprises an additional service control apparatus mainly carrying out advertisement delivery communication sessions, and
the status monitoring function unit and the delivery connection function unit are provided inside the additional service control apparatus.

4. A call control apparatus forming an advertisement delivery system, together with an advertisement delivery apparatus, for delivering advertisement information in a network, arranged in a network accommodating at least a telephone terminal capable of video reproduction, and controlling calls between a sending side telephone terminal or communication device and a receiving side telephone terminal or communication device, said call control apparatus comprising:
a status monitoring function unit monitoring the "voice media state" and "video media state" of the sending side telephone terminal when the sending side telephone terminal starts up; and a delivery connection function unit which establishes a communication session between the sending side telephone terminal and the advertisement delivery apparatus to deliver the advertisement information to the sending side telephone terminal when it is judged that the "voice media state" is "busy" and "video media state" is "available".

5. The call control apparatus as set forth in claim 4, wherein the status monitoring function unit comprises a subscriber management unit managing subscriber information for each subscriber in the call control apparatus and wherein the subscriber management unit further comprises an information area storing information relating to the "voice media state" and "video media state" as subscriber information.

6. The call control apparatus as set forth in claim 4, wherein the delivery connection function unit comprises a call control apparatus mainly carrying out control of calls in the call control apparatus and wherein the call control apparatus further comprises an advertisement delivery judgment unit executing the judgment.

7. The call control apparatus as set forth in claim 6, wherein the advertisement delivery judgment unit judges if a specified condition for beginning delivery of advertisements is satisfied when the telephone capable of video reproduction enters "busy" and, when satisfied, begins delivery of advertisements to the telephone terminal.

8. The call control apparatus as set forth in claim 6, wherein the advertisement delivery judgment unit judges if a specified condition for ending delivery of advertisements is satisfied when the telephone terminal capable of video reproduction ceases being "busy" and, when satisfied, ends delivery of advertisements to the telephone terminal.

9. The call control apparatus as set forth in claim 7, wherein the specified condition for beginning delivery of advertisements is simultaneous satisfaction by the telephone terminal capable of video reproduction of all of the following:
    subscription to an "advertisement delivery service",
    "voice media state" is "busy", and
    "video media state" is "available".

10. The call control apparatus as set forth in claim 8, wherein the specified condition for ending delivery of advertisements is simultaneous satisfaction by the telephone terminal capable of video reproduction of all of the following:
    subscription to an "advertisement delivery service",
    "voice media state" is "available", and
    "video media state" is "busy".

11. The call control apparatus as set forth in claim 5, wherein when the reproduction device of the telephone terminal capable of video reproduction is separated from the telephone terminal body,
    the subscriber management unit includes, as subscriber information areas, an information area corresponding to the telephone terminal and an information area corresponding to the reproduction device separately, and
    wherein the information areas store the information relating to respective "voice media state" and "video media state".

12. The call control apparatus as set forth in claim 1, wherein when the reproduction device capable of video reproduction is combined with or separated from the telephone terminal body and there are two or more reproduction devices,
    the subscriber management unit contains, as subscriber information areas, an information area indicating advertisement reception priority which determines which of the two or more reproduction devices and telephone terminal gets priority in reception.

13. An advertisement delivery method of a system comprised of a call control apparatus arranged in a network accommodating at least a telephone terminal capable of video reproduction and controlling calls between a sending side telephone terminal or communication device and a receiving side telephone terminal or communication device and an advertisement delivery apparatus delivering advertisement information in the network, said advertisement delivery method comprising:
    monitoring the "voice media state" and "video media state" of the sending side telephone terminal at the time of transition of status at the sending side telephone terminal;
    judging whether the "voice media state" is "busy" and the "video media state" is "available"; and
    establishing a communication session between the sending side telephone terminal and the advertisement delivery apparatus in order to deliver the advertisement information to the sending side telephone terminal when judgment in the above judging is not "negative".

14. The advertisement delivery method as set forth in claim 13, which ends a previously established session when it is judged at the previous judging that the "voice media state" is "available" and the "video media state" is "busy".

15. The advertisement delivery method as set forth in claim 13, first storing, at the time of transition of status at the sending side telephone terminal, the "voice media state" and "video media state" of the sending side telephone terminal in a subscriber management unit managing the subscriber information of each subscriber.

16. The advertisement delivery method as set forth in claim 13, wherein the call control apparatus executes each of the steps or, when an additional service control apparatus is further provided, the additional service control apparatus executes each of the steps.

17. A non-transitory computer readable medium having a program therein to cause, by a computer, an advertisement delivery system to execute operations, said advertisement delivery system comprised of a call control apparatus arranged in a network accommodating at least a telephone terminal capable of video reproduction and controlling calls between a sending side telephone terminal or communication device and a receiving side telephone terminal or communication device and an advertisement delivery apparatus delivering advertisement information in the network, said operations comprising:
    monitoring a "voice media state" and "video media state" of the sending side telephone terminal at the time of transition of status at the sending side telephone terminal;
    judging whether the "voice media state" is "busy" and the "video media state" is "available"; and
    when the judgment is not "negative" in the judging, establishing a communication session between the sending side telephone terminal and the advertisement delivery apparatus in order to deliver advertisement information to the sending side telephone terminal.

* * * * *